Sept. 3, 1935.  H. J. HACKER  2,013,560
METHOD AND MEANS FOR OPERATING AN AUTOMOTIVE VEHICLE ANTIGLARE SHIELD
Filed Aug. 30, 1934
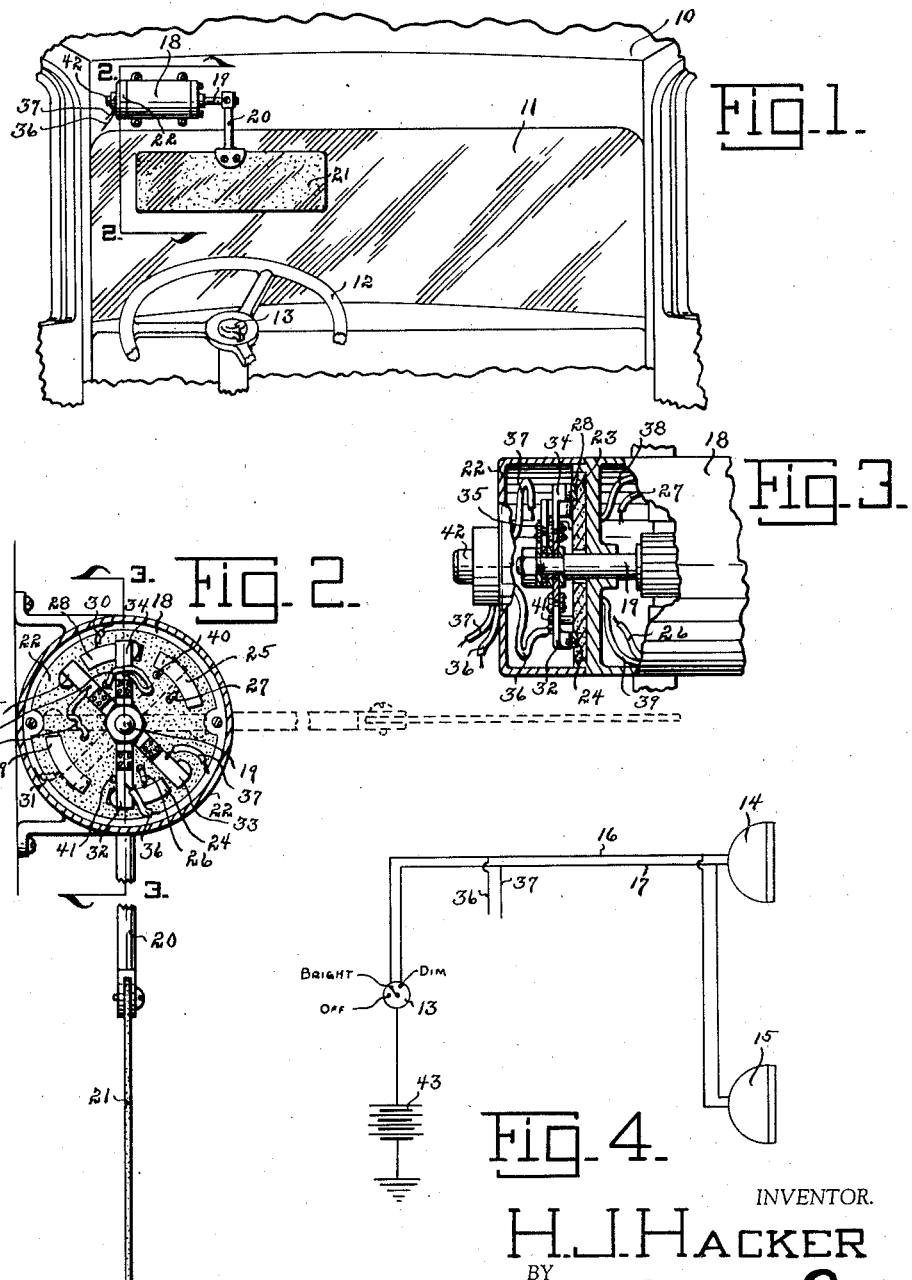
INVENTOR.
H. J. HACKER
BY
M. Talbert Dick
ATTORNEY.

Patented Sept. 3, 1935

2,013,560

UNITED STATES PATENT OFFICE 2,013,560

METHOD AND MEANS FOR OPERATING AN AUTOMOTIVE VEHICLE ANTIGLARE SHIELD

Henry Joseph Hacker, Templeton, Iowa

Application August 30, 1934, Serial No. 742,077

4 Claims. (Cl. 296—97)

The principal object of my invention is to provide an anti-glare shield that automatically moves to an operative position when the headlights of an automotive vehicle are dimmed to pass an approaching headlighted vehicle and then automatically moves to an inoperative position when the headlights are returned to normal lighting after the approaching vehicle has been passed.

A further object of my invention is to provide a self-operating anti-glare shield for automotive vehicles such as automobiles, trucks, buses, and like that may be easily and quickly installed.

A still further object of my invention is to provide a mechanized anti-glare shield for vehicles that is economical in manufacture and durable in use.

These and other objects will be apparent to those skilled in the art.

My invention consists in the construction, arrangement and combination of the various parts of the device, whereby the objects contemplated are attained as hereinafter more fully set forth, pointed out in my claims and illustrated in the accompanying drawing, in which:

Fig. 1 is a rear view of my complete device installed on a vehicle and showing the anti-glare shield in an operative position.

Fig. 2 is an enlarged cross-sectional view of the prime mover mechanism of the device and is taken on line 2—2 of Fig. 1.

Fig. 3 is an enlarged side view of the rear end portion of the prime mover with sections cut away to more fully illustrate its construction. This view is taken substantially on line 3—3 of Fig. 2.

Fig. 4 is an electrical wiring diagram of the lighting system of an ordinary automotive vehicle having headlights and illustrates one method of connecting my device in the electric light circuit of a vehicle.

Anti-glare shields are universally used by vehicle operators to deglare the blinding headlight rays of approaching vehicles. These anti-glare shields are usually of colored transparent or translucent sheet material and are manually movable to a position in front of the eyes of the vehicle operator. Upon approaching a lighted vehicle at night the operator actuates the switch in his lighting circuit to "dim" and also reaches up and manually moves his anti-glare shield into operative position. After the approached vehicle has been passed, he actuates the switch back to "bright" and manually moves the anti-glare shield away from its operative position. Obviously, such a procedure is not only a chore and waste of time, but requires the use of the operator's hand or hands at a critical time when his hands are needed to operate the vehicle proper. I have overcome such objections to the present type of anti-glare shields as will hereinafter be appreciated.

Referring to the drawing, I have used the numeral 10 to designate an ordinary automotive vehicle having a windshield 11, steering wheel 12, and light switch 13. As is well known, these light circuit switches are usually mounted on the steering wheel and are manually movable to an "off" position, a "bright" position, and a "dim" position. Fig. 4 shows the usual vehicle lighting circuit leading to the two headlamps 14 and 15. The numeral 16 designates the electric wire cord connecting the "bright" contact point of the switch to the bright filament of the incandescent light bulbs in the headlamps. The numeral 17 designates the electric wire cord connecting the "dim" contact point of the switch to the dim filament of the incandescent light bulbs in the headlamps.

The numeral 18 designates the electric motor of my device. Any suitable prime mover may be used, but in the drawing I show an electric motor of the reversable type. The numeral 19 designates the armature shaft of the electric motor extending completely through the motor housing. On the front end portion of the shaft 19 is an arm 20 having secured to its outer end the anti-glare shield 21. To install my device the motor 18 is secured by any suitable means such as screws to the inside of the vehicle and adjacent the windshield 11, as shown in Fig. 1. Obviously, with a motor so installed, the rotation of the motor in one direction will bring the anti-glare shield to an operative position shown in Fig. 1, and the rotation of the motor in the opposite direction will swing the shield upwardly to an inoperative out-of-the-way position at the top of the seating compartment of the vehicle, as shown by dotted lines in Fig. 2.

The switch mechanism for causing the motor to rotate in either direction is mounted on the rear end of the motor and is enclosed by the detachable cap 22. The numeral 23 designates a base plate on the rear end of the motor, inside the cap, and surrounding the armature shaft 19, as shown in Fig. 3. This plate is of any suitable non-conductive material. The numerals 24 and 25 designate two metallic contact segments spaced apart and embedded in the plate 23, as shown in Fig. 2. The numeral 26 designates a lead wire connecting the contact segment 24 with the motor 18 for furnishing a flow of electric current to the motor. The numeral 27 designates a lead wire connecting the contact segment 25 with the motor 18 for furnishing a flow of electric current to the motor. The lead wires 26 and 27 are connected to the motor 18 at opposite points in order to reverse the flow of electric current through the motor for causing the motor to rotate in either direction at will. When electric current is furnished to the lead wire 26 the motor 18 will be rotated to the right and when electric current is furnished to the lead wire 27 the motor 18 will be rotated to the left. The numerals 28 and 29 designate two metallic contact segments spaced apart from each other and embedded in the plate 23, as shown in Fig. 2. Both of these contact segments 28 and 29 may be considered as ground segments and are grounded to the motor by the lead wires 30 and 31 respectively. The numerals 32, 33, 34, and 35 designate switch contact arms rigidly secured to the rear end portion of the armature shaft 19 and inside the cap 22. These metallic spring arms 32, 33, 34, and 35 are insulated against contact with the armature shaft 19 and from each other, as shown in the drawing. The arm 32 is electrically connected to the electric light lead wire 16 of the vehicle by the electric lead wire 36. The arm 33 is electrically connected to the electric light lead wire 17 of the vehicle by the electric lead wire 37.

The numeral 38 designates one of the ground wires leading from the motor 18 to the ground contact arm 34. The numeral 39 designates a ground wire leading from the motor to the ground contact arm 35. The numeral 40 designates a stop capable of being engaged by the arm 33 for limiting the rotation of the motor 18 to the right. The numeral 41 designates a stop capable of being engaged by the arm 32 for limiting the rotation of the motor to the left. These stops 40 and 41 are so positioned as to permit the rotation of the motor substantially a quarter of a revolution in either direction.

The practical operation of the device is as follows: When the headlights of the vehicle to which the device is installed are on "bright" light the anti-glare shield 21 will be in an elevated inoperative position near the ceiling of the vehicle and will be yieldingly held in such position by the frictional contacts on the armature and armature shaft and the spring members 35, 34, 33, and 32 yieldingly and frictionally engaging the contacting portions at their outer ends. With the shield in this position the switch contact arm 33 will be in engagement with the switch segment 25 and the arm 35 will be in engagement with the ground segment 29. As the arm 33 is in electrical contact with the light circuit 17, which is the "dim" circuit of the vehicle lighting system, this arm 33 will not be in communication with the source of electrical energy 43. Upon moving the vehicle switch 13, however, to "dim" the contact arm 33 will be placed in electrical communication with the source of electrical energy of the vehicle. From the arm 33 the electric current will flow into the contact segment 25, which is connected to the motor, and as the arm 35 when in engagement with the contact segment 29 grounds the opposite pole of the motor, the motor will rotate to the right, bringing the anti-glare shield 21 downwardly in front of the face of the vehicle operator.

The momentum of the motor will carry the arms 33 and 35 out of contact with the contact segments 25 and 29 and carry the contact arm 32 into engagement with the stop 41 and into contact with the contact segment 24. With the arm 32 in contact with the segment 24, the ground contact arm 34 will be in engagement with the grounded segment 28, as shown in Fig. 2. When the switch mechanism is in this position the motor will be dead inasmuch as it will be connected with the light circuit 16, which is also temporarily dead. However, after passing the approaching vehicle, the driver of the vehicle to which the device is installed will move the switch 13 to "bright" position, thereby breaking the circuit 17 and connecting the circuit 16 with the source of electrical energy. With the circuit 16 in communication with the source of electrical energy, the arm 32 will also be in communication with the source of electrical energy and from the arm 32 the current will flow to the segment 24 and thence to the motor. As the lead wires 27 and 26 are secured to opposite poles of the motor the motor will this time rotate to the right and attain a momentum sufficient to carry the arms 33 and 35 into engagement with the segments 25 and 29 respectively and the arms 32 and 34 out of engagement with the contact segments 24 and 28 respectively. The stop 40 will limit the rotation of the motor to the left and is so positioned that when the arm 33 engages this stop the anti-glare shield 21 will be in an elevated inoperative position. From the foregoing, it will readily be seen that whenever the operator of the vehicle moves his switch 13 to a "dim" position the anti-glare shield 21 will be automatically lowered and when he moves the switch to a "bright" position the anti-glare shield 21 will be moved upwardly and out of the way.

With the switch 13 in an "off" position, the motor 18 will naturally be dead inasmuch as both the circuits 16 and 17 will be dead. The anti-glare shield 21 will remain in the same position in which it was before the switch 13 was moved to the "off" position. If it is desired to manually move the anti-glare shield 21 into or out of operative position the same may be easily accomplished by grasping the shield 21 by the hand and lowering or raising it in the usual manner. If it is desired that the anti-glare shield 21 should not operate when the switch 13 is alternately moved to "bright" and "dim" positions, it is merely necessary to actuate the switch 42 of the motor 18, which is secured to the back of the cap 22 and interimposed in the lead wires 36 and 37.

Some changes may be made in the construction and arrangement of my improved method and means for operating an automotive vehicle anti-glare shield without departing from the real spirit and purpose of my invention, and it is my intention to cover by my claims any modified forms of structure or use of mechanical equivalents which may be reasonably included within their scope.

I claim:

1. In combination with an automotive vehicle having a "dim" and "bright" electric light circuit, an anti-glare apparatus comprising a prime mover, a means for connecting said prime mover to the "dim" electric light circuit of said vehicle at times for rotating said prime mover in one direction, a means for connecting said prime mover to the "bright" electric light circuit of said vehicle at times for rotating said prime mover in the opposite direction, and a movable sheet element operatively connected to said prime mover.

2. In combination with an automotive vehicle having a "dim" and a "bright" electric light circuit and a switch for selectively connecting each of said circuits to a source of electrical energy, an anti-glare apparatus comprising an electric motor, a means for momentarily electrically connecting said electric motor to the "dim" electric light circuit of said vehicle when said switch is moved to place said circuit in electrical communication with said source of electrical energy, a means for momentarily electrically connecting said electric motor to the "bright" electric light circuit of said vehicle when said switch is manually moved to place said circuit in electrical communication with said source of electrical energy; said electrically connecting of said "dim" electric light circuit with said electric motor being at an opposite pole of said electric motor than the pole of the electric motor to which the "bright" electric light circuit is connected, and a movable translucent sheet element operatively connected to said electric motor.

3. In combination with an automotive vehicle having a "dim" and a "bright" electric light circuit, an anti-glare apparatus comprising a rotatably mounted shaft, an anti-glare shield operatively secured to said rotatably mounted shaft, a prime mover for rotating said shaft in both directions, a lead wire electrically connecting said prime mover with the "dim" electric light circuit of said vehicle at times for causing said prime mover to rotate said shaft in one direction, and a second lead wire electrically connecting said prime mover with the "bright" electric light circuit of said vehicle at times for causing said prime mover to rotate said shaft in the opposite direction.

4. In combination with an automotive vehicle having a "dim" and a "bright" electric light circuit, an anti-glare apparatus comprising an electric motor, an anti-glare shield operatively connected to the armature shaft of said electric motor, a lead wire connecting one pole of said electric motor with the "dim" electric light circuit of said vehicle, a second lead wire connecting said "bright" electric light circuit of said vehicle to the opposite pole of said electric motor, and a switch mechanism interposed in both of said lead wires operatively connected to the armature shaft of said electric motor.

HENRY JOSEPH HACKER.